United States Patent

Fleischmann

[11] Patent Number: 5,839,636
[45] Date of Patent: Nov. 24, 1998

[54] SUCTION-OPERATED LINEAR TRACTION DRIVE FOR UNDERWATER HANDLING OF TOWED ARRAYS

[75] Inventor: Lewis Werner Fleischmann, Randallstown, Md.

[73] Assignee: Lockheed Martin Corporation, Binghamton, N.Y.

[21] Appl. No.: 605,415

[22] Filed: Feb. 22, 1996

(Under 37 CFR 1.47)

[51] Int. Cl.⁶ .......................... B65H 23/18; B65H 20/00
[52] U.S. Cl. .................. 226/4; 226/95; 226/172
[58] Field of Search ................. 226/93, 95, 97, 226/170, 171, 172, 173, 4

[56] References Cited

U.S. PATENT DOCUMENTS

| | | | |
|---|---|---|---|
| 2,486,196 | 10/1949 | Nebolsine | 271/74 |
| 2,598,451 | 5/1952 | Simpson | 226/93 |
| 3,024,956 | 3/1962 | Gretter | 226/34 |
| 3,285,485 | 11/1966 | Slator | 226/172 |
| 3,351,034 | 11/1967 | Grek | 226/173 |
| 3,618,840 | 11/1971 | Maurier-Couret | 226/172 |
| 3,722,775 | 3/1973 | Sarracino et al. | 226/100 |
| 3,881,647 | 5/1975 | Wolfe | 226/172 |
| 3,915,291 | 10/1975 | Vogts | 226/95 |
| 4,039,109 | 8/1977 | Rhodes | 226/172 |
| 4,277,010 | 7/1981 | Landskroener et al. | 226/95 |
| 4,336,813 | 6/1982 | Seragnoli | 226/95 |
| 4,469,267 | 9/1984 | Franchuk et al. | 226/172 |
| 4,542,672 | 9/1985 | Pearl | 226/93 |
| 4,735,270 | 4/1988 | Fenyvesi | 226/172 |
| 4,817,845 | 4/1989 | Franchuk | 226/172 |
| 5,178,313 | 1/1993 | LeCompte et al. | 226/95 |
| 5,238,165 | 8/1993 | Gröblacher et al. | 226/172 |
| 5,263,624 | 11/1993 | Zuidberg | 226/173 |
| 5,326,010 | 7/1994 | Moras | 226/172 |
| 5,346,112 | 9/1994 | Ziemek et al. | 226/173 |
| 5,368,212 | 11/1994 | Koch | 226/172 |
| 5,414,988 | 5/1995 | DiPalma et al. | 226/172 |
| 5,518,490 | 5/1996 | Ziegelhoffer | 226/172 |
| 5,595,334 | 1/1997 | Belec et al. | 226/95 |

FOREIGN PATENT DOCUMENTS

| | | | |
|---|---|---|---|
| 1360010 | 4/1963 | France | 226/95 |
| 2006321 | 8/1971 | Germany | 226/93 |
| 5092855 | 4/1993 | Japan | 226/95 |

OTHER PUBLICATIONS

IBM Technical Disclosure Bulletin, R.B. Johnson and G.E. Price, "Vacuum and Timing Advance System", vol. 9, No. 6, Nov. 1966, p. 627.

Primary Examiner—Rodney H. Bonck
Assistant Examiner—Matthew A. Kaness
Attorney, Agent, or Firm—W. H. Meise; P. J. Checkovich; S. A. Young

[57] ABSTRACT

An acoustic array handler (10) includes an elongated linear guide channel (14U, 14L) in which upper (18U) and lower (18L) trains of suction heads (18su) are longitudinally movable. Each suction head (18su) has a porous part shaped to fit the array hose, and together the two trains of suction heads hold the array along the length of the channel. A pump is coupled to the channel for applying suction to the channel and, through the suction heads, to the hose. When immersed in seawater, the pump creates a negative pressure within the channel and the suction heads, which is communicated to the hose, drawing the hose into intimate contact with the trains of suction heads. The trains of suction heads are powered so as to drive them through the channel, drawing the hose with them. In one embodiment of the invention, each of the trains of suction heads is an endless loop, which recirculates through the channel under the impetus of pulleys or sprockets.

15 Claims, 5 Drawing Sheets

SUCTION-OPERATED LINEAR TRACTION DRIVE FOR UNDERWATER HANDLING OF TOWED ARRAYS

FIELD OF THE INVENTION

This invention relates to arrangements for handling towed linear devices such as acoustic arrays, and more particularly to arrangements for underwater deploying and retrieving of such devices or arrays.

BACKGROUND OF THE INVENTION

Underwater acoustic sensing may be performed with the aid of an array of acoustic transducers which is towed behind a ship. Such an array of transducers takes the physical form of a long flexible tube, which contains transducers spaced along its length, and which also contains electrical wires by which each acoustic transducer is connected to control equipment on the ship. The support tube of the array may be filled with a material other than water, for preventing corrosion or leakage currents, or for other reasons. While being towed, there is drag between the array and the surrounding water, and if the towing speed is high, or the array is long, the drag forces may be substantial. Consequently, the acoustic array flexible housing is likely to have reinforcing KEVLAR strength members or fibers extending along the length of the housing.

Acoustic arrays such as those described above are towed from surface ships and from submarines. The arrays must be deployed from the ship, and then retrieved and stowed against the drag force on the array. The hose which contains the array cannot be twisted excessively, or the interior wiring may be damaged, and it cannot be squeezed too much, because the transducers and ancillary electrical equipment may be damaged. Surface ships currently use OK-410 or LINAC (ITW) handlers for the acoustic arrays. The OK-410 is a single-drum winch, and the LINAC is a series of endless belts which are helically wrapped about the array hose, which impart a linear traction force to the array, ideally without twisting the array. Submarines use the DAWG handling system, which is a dual capstan working with a take-up reel.

When a round drum or capstan is used for acoustic array handling, as in the OK-410 or DAWG, the array is wound about the drum or capstan at least once, and possibly several times to obtain enough surface area of the array hose against the drum or capstan to have sufficient friction to prevent slipping when the requisite tension is applied to equal or overcome the drag. A drogue may be attached to the distal or far end of the array to maintain tension on the array during towing, to keep the array straight. During initial deployment of the acoustic array, the distal end of the array or drogue may not even be in the water, if deployed from a surface ship, and as a consequence there may be no drag, or, even if a short length of the drogue or array is in the water, the drag forces may be insufficient to produce enough tension to pull the array from the take-up reel. In order to provide positive deployment, pinch rollers are commonly used to pinch the array wound on the drum or capstan, to assure enough friction to allow the array to be initially deployed by driving the drum or capstan in a deployment direction. Once a sufficient length of the drogue or array is in the water and being towed, the drag forces produce enough tension in the array to allow deployment without powering the drum or capstan, so the drum or capstan may be idled. Eventually, when the array is fully deployed, the drum or capstan must be locked to prevent further deployment, and must remain locked until such time as it is retrieved. When fully deployed, a length of tow cable may extend from the ship to the proximal or near end of the array, so that the array may be located sufficiently far from the ship to avoid being influenced by its acoustic signature.

During retrieval of the array using a drum or capstan, the drum or capstan must apply tension to the array which is sufficient to overcome the drag of the array. The speed of the ship and the retrieval rate must be tailored to the breaking strength of the array or its tow cable. The drum or capstan arrangement has the disadvantage, especially when a pinch roller is used, that the support hose of the acoustic array may be radially squeezed, and the interior fluid "milked" toward the distal end of the array, resulting in a pressure increase at the distal end and possible rupture. A greater disadvantage to the wrapping of the array around a drum or capstan is that the crushing forces may require the use of interior transverse supports or walls to prevent damage to electronic components, which tends to make the array more rigid and more costly. The greatest disadvantage of the use of a drum or capstan handling arrangement is that those hoses which include longitudinal strength members must be derated in tension capability, because the strands of the reinforcing fiber do not share the load equally. More particularly, the reinforcing strand which is most outboard of the neutral bending axis of the hose have the highest tensile stress or load. The strands which are inboard of the neutral bending axis have no tensile stress at all, and do not contribute toward withstanding the total longitudinal forces. The derating is severe; a longitudinally reinforced hose rated for 10,000 lbs. in straight or linear tension can carry only about 800 lbs. tension when wrapped around a curved drum or capstan.

The abovementioned disadvantages of drum- and capstan-type acoustic array handlers makes linear traction drives desirable. The LINAC is a linear traction device which, as mentioned, uses endless belts helically wrapped around the array hose to provide the desired friction. The LINAC, however, has the disadvantage that the belts cause a crushing force which is proportional to the tension load, and as a result it may require support walls in the hose, and may milk the array. Furthermore, while the LINAC works well with large array hoses, small array hose diameters result in small radii of curvature of the drive belts around the hose, which in turn results in excessive bending moments which shorten their useful life. Also, the presence of slime on the hose can lead to slippage unless the number of turns of belt is increased. Lastly, the LINAC is a complex system with a multitude of gears and pulleys, which does not lend itself to use on a submarine where it might be submerged in seawater.

Improved acoustic array handlers are desired.

SUMMARY OF THE INVENTION

An apparatus according to the invention handles an elongated, elastomer or hose-like towed device having a diameter, such as a towed array. The cross-section of the device being handled does not need to be circular. The apparatus includes an elongated guide defining an elongated guide tunnel, which in turn defines a guide tunnel axis. The elongated guide also including open first and second ends. The guide tunnel has particular dimensions transverse to the guide tunnel axis at locations remote from the first and second ends. The guide tunnel is symmetrically disposed about a plane of symmetry, such as a horizontal plane of symmetry, which contains the axis. In a preferred embodiment of the invention, the guide tunnel is located underwater during operation. A pump is coupled to the guide for pumping water from the guide tunnel during operation, whereby a net negative pressure occurs within the guide tunnel. A first train of individual suction heads is coupled together for being moved as a train. The first train of individual suction heads is longer than the guide tunnel, and is located partially within the guide tunnel and on a first side of the plane of symmetry. Each of the suction heads of the first train includes a body which fits within the first side of the guide tunnel, in a manner which allows the flow of water through the guide tunnel parallel to the guide tunnel axis and outside of the suction heads. Each suction head body defines a curved surface in the form of a portion of a right circular cylinder defined by a cylinder axis and a diameter substantially equal to the diameter of the device being handled. The curved surface, when the suction head is mounted within the guide tunnel, faces the plane of symmetry, with the cylinder axis parallel to the guide tunnel axis. The body of each of the suction heads also includes an interior suction channel extending from the curved surface to another face of the body, whereby the negative pressure within the guide tunnel may be communicated through the body of the particular suction head through its curved surface. Thus, when suction is applied to the channel, it is communicated through each of the suction heads of the first train, and through the channel(s) of the curved surface. The curved surface therefore tends to clamp onto half the surface of the device being handled, at the location of the suction head. A second train of individual suction heads is coupled together for being moved as a train. The second train is located partially within the guide tunnel and on a second side of the plane of symmetry of the channel. Each of the suction heads of the second train includes a body which fits within the second side of the guide tunnel, in a manner which allows the flow of water through the guide tunnel parallel to the guide tunnel axis and outside of the suction head. The bodies of the suction heads of the second train are essentially identical to those of the first train, and define a curved surface in the form of a portion of a right circular cylinder defined by a cylinder axis and a diameter substantially equal to the diameter of the device. The curved surface of the suction heads of the second train, when the second train is mounted within the guide tunnel, face the plane of symmetry from the second side, with the cylinder axis parallel to the guide tunnel axis, so that the curved surfaces of the suction heads of the first and second trains together form a tunnel having a cross-section corresponding to that of the device being handled. In the case of a hose-like device having a circular cross-section, the tunnel defined by the curved surfaces of the suction heads is cylindrical, with substantially the same diameter as the device, and having suction at the curved walls thereof. Thus, when the device is located within the cylindrical tunnel, the suction heads individually grasp the device at many locations, and on the upper and lower halves of the device. A traction arrangement is coupled to the first and second trains, for applying force to the first and second trains tending to move the first and second trains, and the device therewith, through the guide tunnel. At the first and second ends, the guide tunnel may be flared to allow easy entry and exit of the suction heads.

In a particular embodiment of the invention, each of the bodies of the suction heads is hollow to thereby define a cavity, and has a passage opening from the cavity to the another face of the body, and each of the curved surfaces of the suction heads contains channels extending between the cylindrical tunnel and the cavity, whereby the negative pressure is communicated to the cylindrical tunnel. The curved surface may be porous. The traction arrangement may include deployment and retrieval drive pulleys associated with the each train, and the pulleys may be fitted with sprockets to better grasp each suction head. The deployment drive pulleys associated with the first and second trains are preferably synchronized, so as to tend move the trains together. Each of the suction heads, in a particular embodiment, includes a linking arrangement for coupling to adjacent suction heads in a manner allowing flexing of the train around the pulleys. A suction relief valve may be coupled to the pump, for limiting the amount of suction which the pump can apply to the channel. A method according to the invention includes the step of juxtaposing to a portion of the device being handled a train of first and second suction heads as defined above. The first and second suction head trains are laid along a portion of the device lying within an elongated guide channel, for guiding the train of first and second suction heads. Traction force is applied to at least one of the first and second trains, to thereby tend to move the one of the first and second trains through the guide channel. Suction is applied to the interior of the guide channel, and coupled from the interior of the guide channel, through each of the suction heads within the channel, to the porous surfaces of the first and second suction heads, whereby the first and second suction heads clamp onto the device, and the traction force is applied to the device for tending to move the device through the channel. At least some of the steps are preferably performed underwater.

DESCRIPTION OF THE INVENTION

Figure 1A:
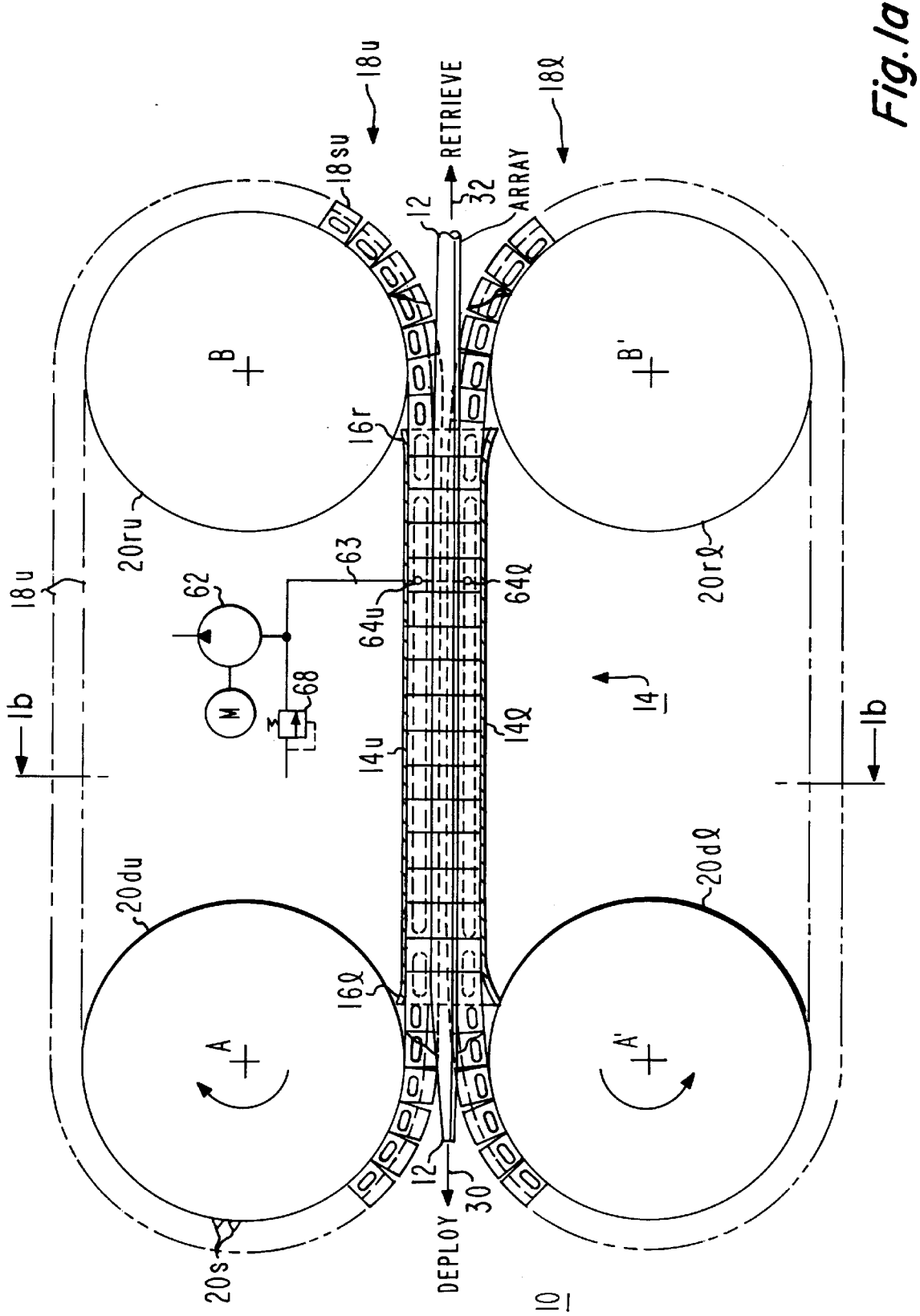
FIG. 1a is a simplified side elevation view of a deployment and retrieval device or handler according to the invention, for handling an elongated member.

In FIGS. 1a, 1b, 1c, 1d, and 1e, a traction or handling device 10 deploys and retrieves a towed array 12, which is in the form of a flexible, elastomer-covered tube with a circular cross-section. For purposes of clarity, the deployment direction of device 12 is indicated by an arrow 30, and the retrieval direction is indicated by an arrow 32 in FIG. 1a. Handling device 10 includes a guide channel 14, including an upper guide channel portion 14u and a lower guide channel portion 14l. The interior cross-section of channel 14 is the same throughout its length, except for a flare 16l and 16r at the left and right ends, respectively.

An upper train 18u of individual suction cups 18su extends through upper guide channel 14u, and in an endless loop around an upper deploy drive pulley 20du and an upper retrieve drive pulley 20ru. A lower train 18l of individual suction cups 18sl extends through lower guide channel 14l, and in a similar loop around a lower deploy drive pulley 20dl and a lower retrieve drive pulley 20rl. As described below, the upper train suction heads 18su and the lower train suction heads 18sl clamp onto the array 12 as they enter guide channel portions 14u and 14l, respectively, and the trains are moved through the channel portions by rotation of the appropriate ones of the deployment drive pulleys or the retrieval drive pulleys. More particularly, when deployment is desired, the length of the towed array may be small, with a small resulting drag on the exposed portion of the array. Under this condition, the drag may be insufficient to overcome the frictional forces in the system, and it may be desirable to positively drive the trains in the deployment direction by driving deployment pulleys 20du and 20dl in a clockwise direction as seen in FIG. 1a in order to pull the trains 18u and 18l through the channel 14u, 14l for deployment of the device 12.

The suction heads 18s of trains 18su and 18sl of FIG. 1a are identical. One suction head is illustrated in somewhat more detail in FIG. 1c. In FIGS. 1c and 1d, suction head 18s includes a generally rectangular body 34 which has a hollow interior cavity 36. Interior cavity 36 communicates with the exterior of body 34 by way of a pair of apertures 38. Each suction head 18s has a hose-gripping surface 40 which is curved into a cylindrical shape to correspond to the shape of one-half of the hose, and dimensioned accordingly. Hose-gripping surface 40 is porous, and communicates with interior cavity 36. Each suction head 18s also includes coupling arrangements adapted for connecting each suction head to the two adjacent suction heads, to make a train. The coupling arrangements include a pair of lugs 42a, 42b defined at one longitudinal end of body 34, and a corresponding pair of mating lugs 44a, 44b at the other longitudinal end of the body, of which lug 44a in FIG. 1c is illustrated by dashed lines. Each of the lugs defines an aperture 46, and the apertures 46 are aligned when the lugs 42a and 42b are juxtaposed with lugs 44a and 44b, respectively, to form a train of suction heads. When so aligned, apertures 46 are transfixed by a hinge pin 48, which is held in place by a pair of snap rings 50a, 50b, which fit into grooves 48a, 48b. A spacer 52 lying between lugs 42a and 42b helps to prevent bending of the lugs. A mating tongue-and-groove set 54, 56 defined by the body 34 of each suction head 18s, mates during those intervals when the suction heads form a straight train, and prevent the suction heads from becoming rotationally misaligned. FIG. 1e illustrates, in longitudinal cross-section, two suction heads arranged in a train.

Figure 1B:
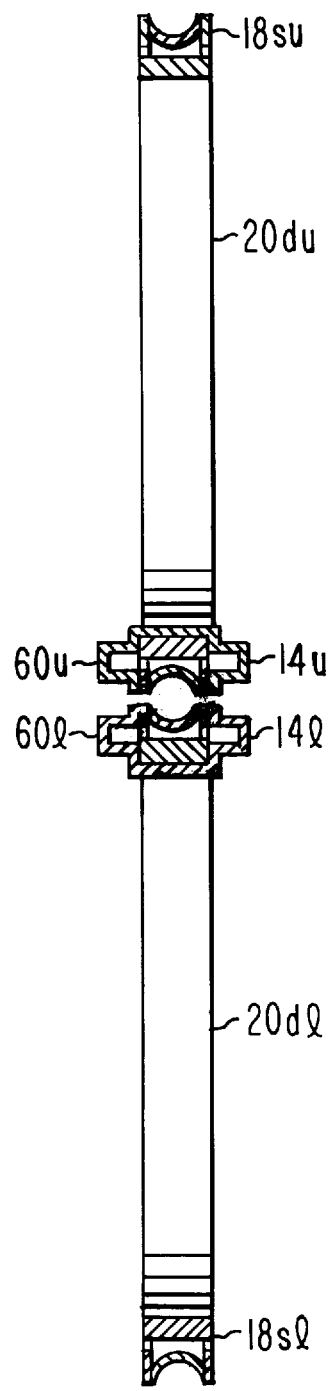
FIG. 1b is a cross-section thereof taken along section lines 1b—1b.
Figure 1C:
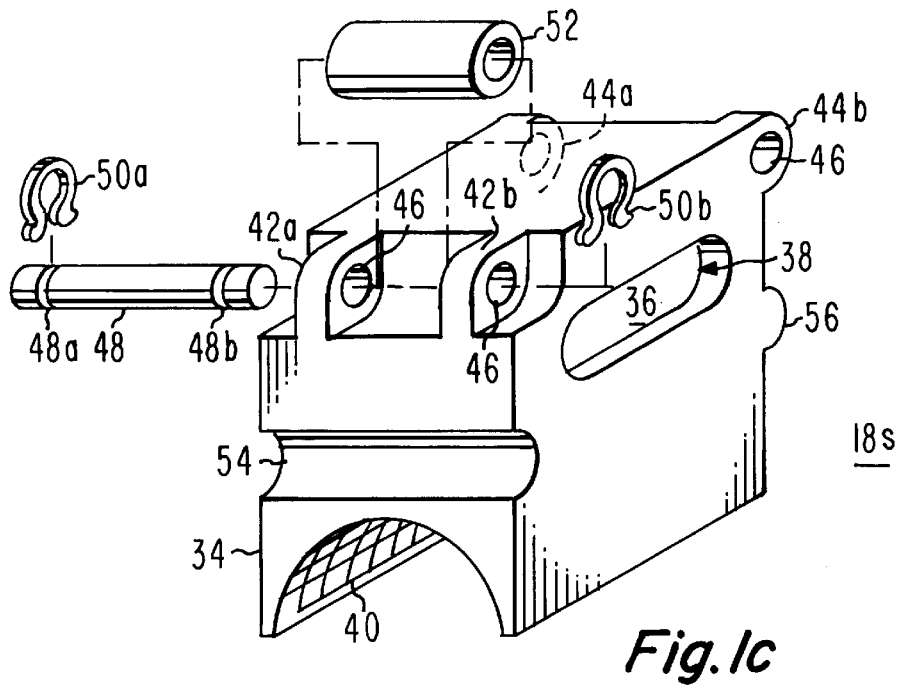
FIG. 1c is a perspective or isometric view, partially exploded, of a single suction head of the arrangement of FIG. 1a, FIG. 1d is a simplified perspective or isometric view, partially cut away to reveal interior details, of a suction head and a channel of the arrangement of FIG. 1a, and FIG. 1e is a side elevation view of two suction heads such as that of FIG. 1c, joined together to form a train.
Figure 1D:
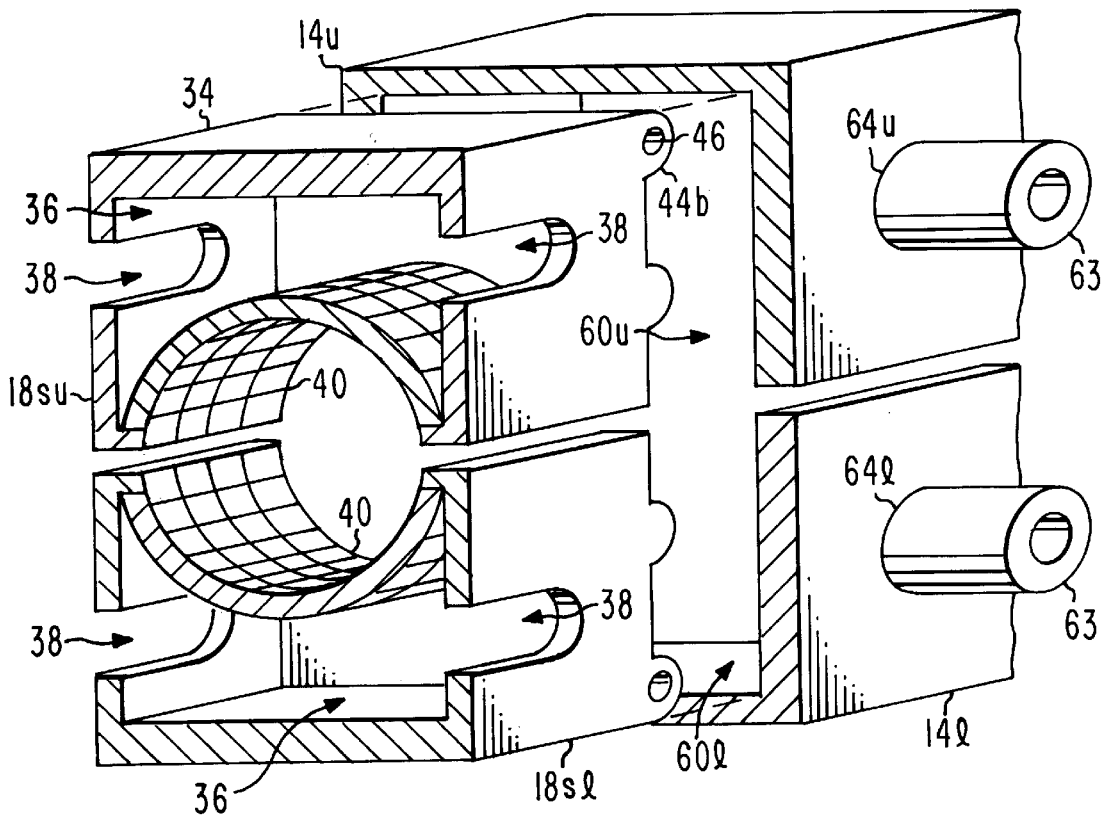
Figure 1E:
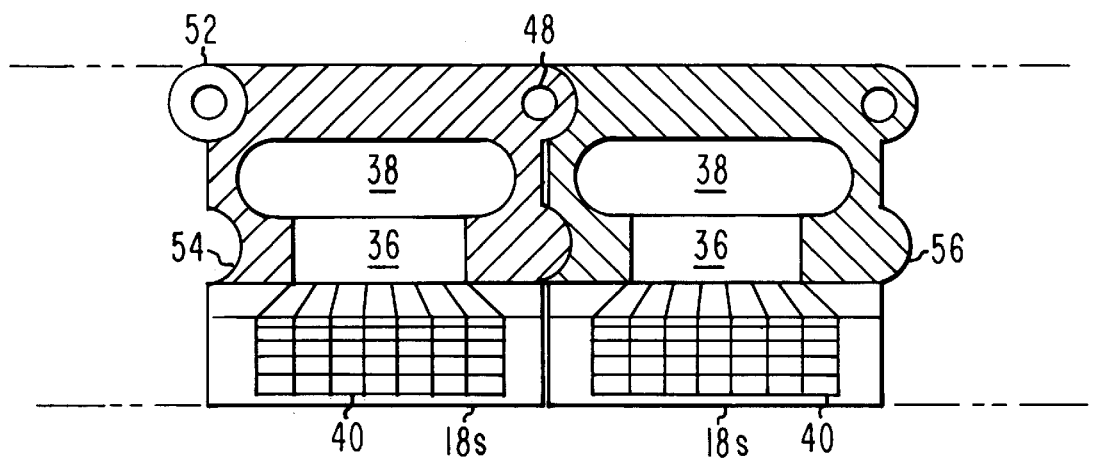
Figure 2:
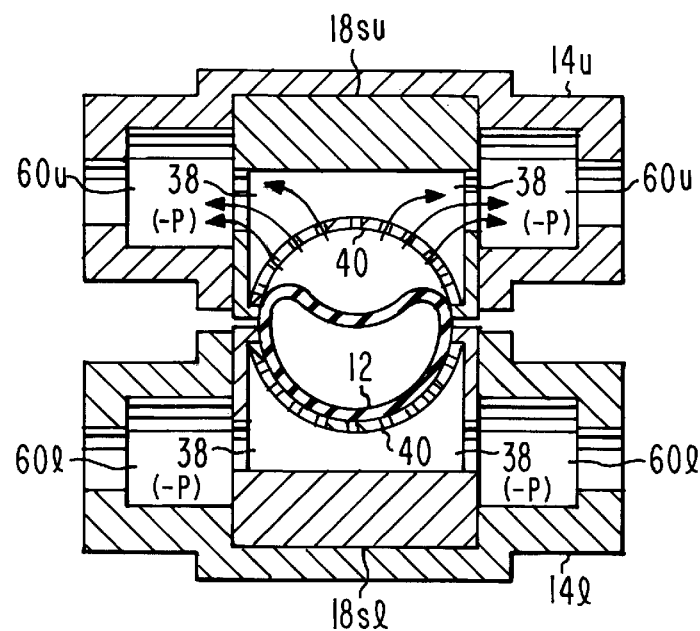
FIG. 2 is a cross-section of a guide channel and a pair of suction heads as in FIG. 1a, with a device being handled being fastened onto by a pair of adjacent suction heads.

The cross-sectional shape of a preferred embodiment of the channel 14u, 14l is illustrated in FIGS. 1b and 2. As illustrated therein, each channel 14u, 14l closely fits portions of the body of each of the suction heads 18su located therein, so as to provide guidance along a straight path through the channel. Upper channel 14u also includes portion which defines a pair of liquid manifolds or channels, or pipe-like portions 60u, and lower channel 14l also defines a pair of liquid manifold channels or pipe-like portions 60l. These pipe-like portions allow the flow of water, in the case of water immersion, along the length of the channel, which might otherwise be blocked by the presence of the train of suction heads. The pipe-like portions 60u and 60l are located so as to be adjacent to the apertures 38 in each of the suction heads. In a slightly different or simplified embodiment of the invention, illustrated in FIG. 1d, the pipe-like portions 60u and 60l are simply a portion of the interior of the channel which is larger than the body of the suction heads.

Referring to FIG. 1a, a seawater pump 62 is coupled by a pipe 63 to an upper port 64u of upper channel 14u, and to a lower port 64l in lower channel 14l. Since the left and right ends 16l and 16r of channels 14u and 14l are underwater, seawater pump 62 tends to lower the pressure between the pipe-like portions 60u and 60l of the upper and lower channels and the exterior of the channels. This lower or negative pressure, designated –P in FIG. 2, is communicated into the interior of each of the suction heads 18su through the side apertures 38 of each suction head. The negative pressure is also communicated through curved porous surface 40 of each suction head. Referring to FIG. 2, the negative pressure is communicated equally to the grasping surfaces 40 of the upper and lower suction heads, and to the exterior surface of hose 12, illustrated as being partially collapsed. The interior surface of hose-like device 12 is at a pressure commensurate with the depth of the hose under the water's surface, and therefore is at a higher pressure than the negative pressure communicated to the grasping surface 40 of the suction head 18s. As a consequence, the negative pressure surrounding the hose tends to cause the hose to fill out, even if partially collapsed, or has an elliptical or cardioid-shaped cross-section when it enters the channel. When filled out, the outer surface of the hose is held in intimate relation to the grasping surface, and a normal force is exerted between the grasping surface 40 and the exterior of the hose. Since the suction is applied equally to channels on each side of the suction heads 18s, there is no tendency to pull any suction head hard against either of the walls of the channel.

In the absence of a hose 12 within the tubular channel defined by the aligned grasping surfaces 40 of the pair of trains 18u, 18l, seawater will be sucked into each of the porous grasping surfaces 40. When a hose is introduced into one end, such as end 16l, of the handler, the hose wall will be sucked against the perforated surfaces 40, and will conform to those surfaces. The pore size, or the mesh size in the case of a mesh surface 40, should be selected in conjunction with the compliance of the hose surface so that, at high suction, or at a large differential pressure, the outer surface of the hose wall begins to extrude into the pore or mesh openings, thus providing an interference engagement between the hose and grasping surfaces of the suction heads. The maximum differential pressure can be automatically controlled by a pressure relief regulator valve, illustrated as 68 in FIG. 1a, and is set to a pressure differential which does not cause permanent deformation of the hose surface.

When drive is applied synchronously to one or the other of the sets of deployment or retrieval pulleys, the trains 18u, 18l of suction heads 18s are pulled through the channels in an appropriate direction. When the hose 12 extends all the way through the handler, the maximum surface engagement occurs, and maximum traction forces can be applied to the hose. Such maximum force is normally only necessary during retrieval of a long hose being towed at the maximum speed. In the context of cable-laying and retrieval for repair, the maximum force will seldom be needed, since there is no towing in any normal sense.

As the hose 12 is pulled through the handler, the suction heads 18s at the exit end of the channels 14u, 14l must release the hose, otherwise there might be a tendency for damage as the suction heads pull away from the hose as they begin to travel a path about the adjacent pulley. The suction heads are automatically released at the ends of the channel by flared portions 16l and 16r, which allow ambient pressure to reach the apertures 38 of the suction heads, thereby eliminating the suction which holds the hose to the grasping surface. The same effect could be achieved without a flare, by providing pressure equalizing apertures near the ends of the channel.

The normal force which tends to hold the hose surface against the porous grasping surface of the suction head occurs only at the grasping surface. Any slime on the hose will tend to be sucked off the hose surface, and to migrate to the seawater pump; consequently, slime will not substantially affect operation. Even if some slippage of the hose relative to the suction heads occurs due to slime, the hose will eventually be sucked clean, and frictional forces will be reestablished. It should particularly be noted that no milking of the hose can occur, since the forces applied to the hose are radially outward, rather than crushing forces directed radially inward. The traction forces are applied only to the hose, and not to any structures within the hose.

Figure 3:
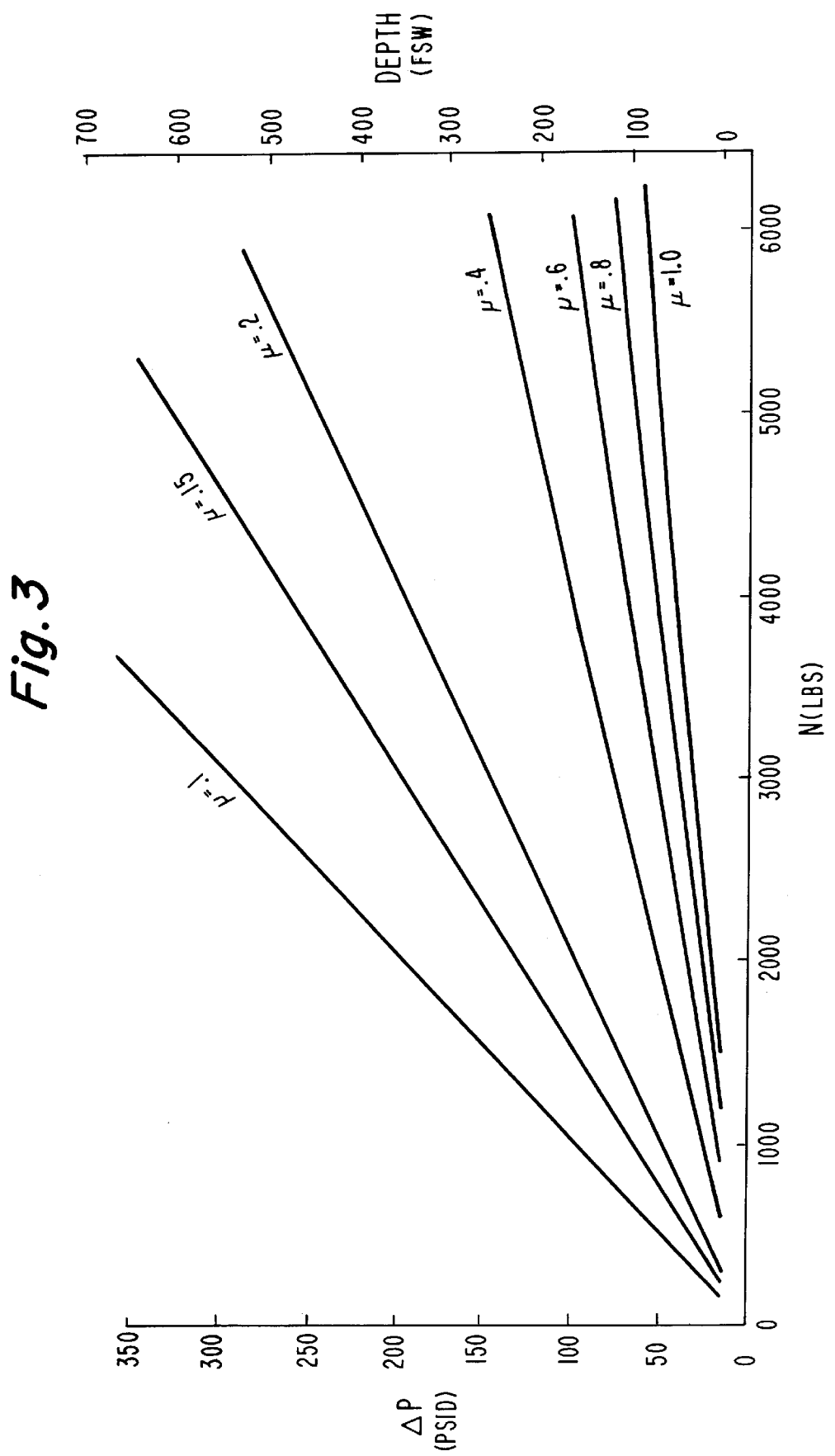
FIG. 3 illustrates plots of the normal force which can be applied to a suction head as a function of depth under water, and with the coefficient of friction as a parameter.

FIG. 3 illustrates a family of "parametric" curves, ranging from a coefficient of friction $\mu$ ranging from 0.1 to 1.0, and wherein the differential pressure $\Delta P$ exerted by the seawater pump is plotted against the normal force N which can be exerted at 20° C. over an area corresponding to the surface of a one-inch hose 33¼ inches long. This corresponds to the normal force which can be applied to a one-inch hose by a handler having a channel length of slightly more than 33 inches.

Water vaporizes or boils at 20° C. when a vacuum of 14.36 psi (0.339 psia) is applied. At 0° C., water changes phase at 0.088 psia. In all cases, when the vapor pressure of the water at a given temperature equals the total environmental pressure, any further reduction in the environmental pressure will cause the water to boil into vapor. If the depth of the handler is zero (just under the water surface), the maximum differential pressure which can be achieved is 14.36 psi, and therefore the values at the bottom of the chart of FIG. 3 begin at 14.36 psi. As the depth of the hose handler is increased, more pressure can be applied by the seawater pump without causing boiling in the low-pressure portion. For example, at 500 feet of seawater (FSW) a $\Delta P$ of 260 psid can be exerted on each and every square inch of hose within the handler. With a $\Delta P$ of 260 psid and a friction coefficient of 1.0, a 33.25 inch section of hose can pull 8,645 lb., if sufficient pulley torque is available. Assuming pulley diameters of three feet, a maximum deploy or retrieve speed of 200 ft./min., only 9.09 HP is required to exert 1500 lbf of tension.

Thus, an acoustic array handler according to the invention may be used underwater, and takes advantage of the seawater to effect traction. It does not tend to crush or milk the array during either deployment or retrieval, and can deliver full tension loads up to the maximum linear breaking strength of the array hose. Due to the suction effect, it can effect coefficients of friction which exceed unity, while maintaining the hose round during handling. It is little affected by the presence of slime on the hose. The handler works equally well with pressurized or unpressurized hose. The hose is not required to have interior walls or spacers to protect electronics from being crushed. The handler can be used with very small diameter hoses, such as fiber optic arrays and "thin line arrays." A handler according to the invention will work with very compliant thin-wall hoses as well as with tow cable of equal diameter. There are no inherent depth limitations to the use of the handler according to the invention, and thus it may be used on a submarine to the maximum rated depth of the submarine.

Other embodiments of the invention will be apparent to those skilled in the art. For example, while the invention has been described as being useful for towed arrays, it may also find use in handling underwater communication paths such as telephone or fiber-optic lines. While the towed array described is flexible and can be rolled onto and from a reel, the linear traction device according to the invention can also handle a substantially straight, rigid tube, and even a tube having a noncircular cross-section. While the drive wheels have been described as pulleys designated as 20 with a suffix, any or all of them may have sprockets, illustrated as 20s in FIG. 1a, for more firmly driving the suction heads. While immersion in seawater has been described, fresh water may be the medium. Instead of being mounted top/bottom, the trains of suction heads may be mounted right/left, with the same effect. Similarly, it should be possible to make four trains of suction heads, in which each head handles a 90° sector of the hose; such an arrangement must be more complex, and provides no improvement in performance. The pulley diameters, channel or handler length, differential pressures, and other variables may be selected to provide the desired performance. The pulleys may of course be locked in position in order to tow the array.

What is claimed is:

1. A handler for a hose-like device, said handler comprising:

an elongated channel defining an interior cross-section, first and second ends, and a suction port;

a pump coupled to said suction port for creating a negative pressure in said interior of said channel;

a train of suction heads extending at least through said channel, each of said heads including a face portion which is shaped to conform to the exterior of said hose-like device, each of said heads also including a channel which allows said negative pressure to be communicated to said face, whereby, when said hose-like device lies within said handler, said hose-like device is drawn into intimate contact with said face of each of said suction heads to which said negative pressure is applied, each of said suction heads being hingedly coupled to adjacent suction heads of said train for articulation relative thereto;

drive means coupled to said train of suction heads for moving said train of suction heads longitudinally through said channel, drawing said hose-like device lying within said handler therewith.

2. An apparatus for handling an elongated, hose-like device having a diameter, said apparatus comprising:

an elongated guide defining an elongated guide tunnel defining a guide tunnel axis, and also including open first and second ends, said guide tunnel having particular dimensions transverse to said axis at locations remote from said first and second ends, said guide tunnel being symmetrically disposed about a plane of symmetry which contains said axis, said guide being located underwater during operation;

a pump coupled to said guide for pumping water from said guide tunnel during operation, whereby a net negative pressure occurs within said guide tunnel;

a first train of individual rigid suction heads coupled together for being moved as a train, said first train being located partially within said guide tunnel and on a first side of said plane of symmetry, each of said suction heads of said first train including a body which fits within said first side of said guide tunnel, in a manner which allows the flow of water through said guide tunnel parallel to said guide tunnel axis and outside of said suction head, said body defining a curved surface in the form of a portion of a right circular cylinder defined by a cylinder axis and a diameter substantially equal to said diameter of said device, said curved surface, when said suction head is mounted within said guide tunnel, facing said plane of symmetry with said cylinder axis parallel to said guide tunnel axis, said body of each of said suction heads also including an interior suction channel extending from said curved surface to another face of said body, whereby said negative pressure within said guide tunnel may be communicated through said body of said suction head through said curved surface;

a second train of individual rigid suction heads coupled together for being moved as a train, said second train being located partially within said guide tunnel and on a second side of said plane of symmetry, each of said suction heads of said second train including a body which fits within said second side of said guide tunnel, in a manner which allows the flow of water through said guide tunnel parallel to said guide tunnel axis and outside of said suction head, said body defining a curved surface in the form of a portion of a right circular cylinder defined by a cylinder axis and a diameter substantially equal to said diameter of said device, said curved surface, when said suction head is mounted within said guide tunnel, facing said plane of symmetry with said cylinder axis parallel to said guide tunnel axis, said body of each of said suction heads also including an interior suction channel extending from said curved surface to another face of said body, whereby said negative pressure within said guide tunnel may be communicated through said body of said suction head through said curved surface, whereby said curved surfaces of said suction heads of said first and second trains together define a cylindrical tunnel having substantially the same diameter as said device, and having suction at the curved walls thereof which, when said device is located within said cylindrical tunnel, grasps said device at each suction head; and traction means coupled to said first and second trains, for applying force to said first and second trains tending to move said first and second trains, and said device therewith, through said guide tunnel.

3. An apparatus according to claim 2, wherein:

each of said bodies of said suction heads is hollow to thereby define a cavity, and has a passage opening from said cavity to said other face of said body, and each of said curved surfaces of said suction heads contains channels extending between said cylindrical tunnel and said cavity, whereby said negative pressure is communicated to said cylindrical tunnel.

4. An apparatus according to claim 3, wherein said channels through said curved surface are in the form of pores.

5. An apparatus according to claim 3, wherein;

said body of each of said suction heads is in the general shape of a cube having said curved surface and five other faces, leading and lagging faces of which are normal to said guide tunnel axis during those times when within said guide tunnel, an upper face the normal of which is orthogonal to said guide tunnel axis, and which upper face is adjacent said leading and lagging faces, and first and second side faces of which have their normals orthogonal to said guide tunnel axis and are adjacent to said curved surface; and wherein said passage opening from said cavity to said other face of said body comprises an aperture opening from said cavity through one of said first and second side faces.

6. An apparatus according to claim 2, wherein said traction means includes deployment and retrieval drive pulleys associated with said first train.

7. An apparatus according to claim 6, wherein said drive pulleys include sprockets for firmly gripping said first train.

8. An apparatus according to claim 6, wherein said traction means further includes deployment and retrieval drive pulleys associated with said second train.

9. An apparatus according to claim 8, wherein said deployment drive pulleys associated with said first and second trains are synchronized so as to tend to move said trains together.

10. An apparatus according to claim 8, wherein said retrieval drive pulleys associated with said first and second trains are synchronized so as to tend to move said trains together.

11. An apparatus according to claim 2, wherein each of said suction heads of said first train includes linking means for coupling to adjacent suction heads in a manner allowing flexing of said train in a train travel plane.

12. An apparatus according to claim 2, wherein each of said suction heads of said second train includes linking means for coupling to adjacent suction heads in a manner allowing flexing of said train in said train travel plane.

13. An apparatus according to claim 2, further comprising a suction relief valve coupled to said pump, for limiting the amount of suction which said pump can apply to said channel.

14. A method for handling of an elongated device having an elastomeric outer surface, comprising the steps of:

juxtaposing to a portion of said device a train of individual, rigid, mutually articulated first suction heads, each of said first suction heads having a porous surface conforming to one half of the cross-section of said device, and each of said first suction heads having an aperture leading from said porous surface to another surface;

juxtaposing to said portion of said device a train of second suction heads, each of said second suction heads having a porous surface conforming to the other half of said cross-section of said device, and each of said second suction heads having an aperture leading from said porous surface to another surface;

locating said first and second suction heads lying along said portion of said device within an elongated guide channel, for guiding said train of first and second suction heads along a path;

applying traction force to at least one of said first and second trains, to thereby tend to move said one of said first and second trains through said guide channel;

applying suction to the interior of said guide channel;

coupling said suction from said interior of said guide channel, through each of said suction heads within said channel, to said porous surfaces of said first and second suction heads, whereby said first and second suction heads clamp onto said device, and said traction force is applied to said device for tending to move said device through said channel.

15. A method according to claim 14, wherein said steps of juxtaposing a train of second heads, locating said suction heads within an elongated guide channel, and applying traction force are performed underwater, and wherein said step of applying suction is performed by pumping water from said channel, to thereby create a negative pressure of water within said guide channel.

* * * * *